June 2, 1964 J. T. BANGERT 3,135,932

SIGNAL DELAY SYSTEM

Filed Aug. 14, 1959 2 Sheets-Sheet 1

INVENTOR
J. T. BANGERT
BY
Ralph T. Holcomb
ATTORNEY

June 2, 1964 J. T. BANGERT 3,135,932

SIGNAL DELAY SYSTEM

Filed Aug. 14, 1959 2 Sheets-Sheet 2

INVENTOR
J. T. BANGERT

BY Ralph T. Holcomb
ATTORNEY

3,135,932
SIGNAL DELAY SYSTEM

John T. Bangert, Chatham, N.J., assignor to Bell Telephone Laboratories, Incorporated, New York, N.Y., a corporation of New York Filed Aug. 14, 1959, Ser. No. 833,644
7 Claims. (Cl. 333—29)

This invention relates to wave transmission and more particularly to signal delay systems and methods.

The principal object of the invention is to delay a signal by amounts which vary with frequency in any desired manner. Another object is to reduce the cost of a delay system in which the product of delay times bandwidth is large. A further object is to provide a flat loss characteristic in such a delay system.

In wave transmission systems, it is often necessary to provide a delay characteristic which varies with frequency. An unrestricted shape may be required for delay equalization. Also, a linear characteristic with positive or negative slope may be required for signal dispersion, or one with a complementary slope for signal collapse.

The signal delay system of the present invention is well adapted to provide characteristics of this type, especially when a large delay-bandwidth product is involved. The signal is separated by filters into bands which are provided with different delays, usually flat, to form a series of steps matching the desired characteristic as nearly as possible. A delay corrector fills in the residual delay. Individual phase correctors flatten the loss characteristic in the cross-over regions between bands. The delay is preferably provided by recording, storing, and reproducing the signal. This method reduces the cost by avoiding the use of a large number of lumped-element delay sections, with their associated reactors. When the desired delay characteristic has a constant slope, the delay corrector is preferably of the transversal type and utilizes the same storage device.

The nature of the invention and its various objects, features, and advantages will appear more fully in the following detailed description of the typical embodiments illustrated in the accompanying drawing, of which FIG. 1 shows a generalized delay-frequency characteristic with the frequency bands and the blocks of flat delay indicated;

Figure 1:
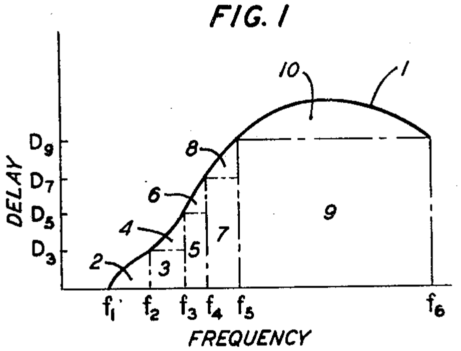

The solid-line curve 1 in FIG. 1 represents any desired delay characteristic between the frequencies $f_1$ and $f_6$. The area under the curve is divided into a number of rectangular delay-frequency blocks such as 3, 5, 7, and 9, with boundaries at the frequencies $f_2$, $f_3$, $f_4$, $f_5$, and $f_6$. The height of each of these flat-delay blocks is equal to the minimum delay in that particular frequency band.

Figure 2:
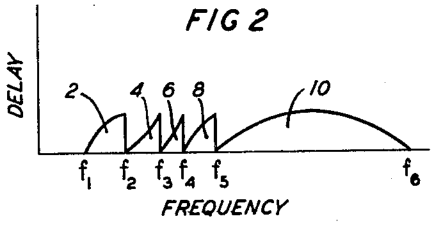
FIG. 2 shows the residual delay-frequency characteristic required in addition to the blocks of flat delay.

Each block differs from the adjacent one by approximately the same increment of delay, $D_3$. These blocks thus form a staircase pattern in which the steps have equal risers but unequal treads. The difference between the desired curve 1 and the staircase characteristic is represented by the areas 2, 4, 6, 8, and 10, shown by themselves in FIG. 2. This residual delay is supplied by a suitable delay corrector.

Figure 3:
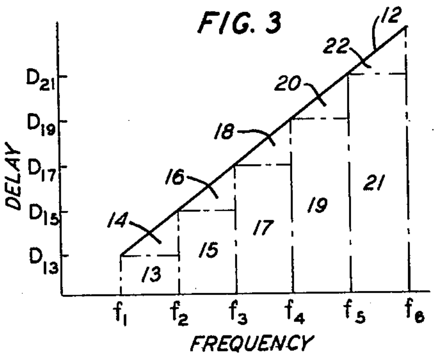
FIG. 3 shows a linear delay-frequency characteristic with positive slope.

The delay-frequency characteristic 12 in FIG. 3 is linear, with a positive slope. As in FIG. 1, the area under this curve is divided into rectangular flat-delay blocks 13, 15, 17, 19, and 21, leaving the residual blocks 14, 16, 18, 20, and 22, shown alone in FIG. 4.

Figure 5:
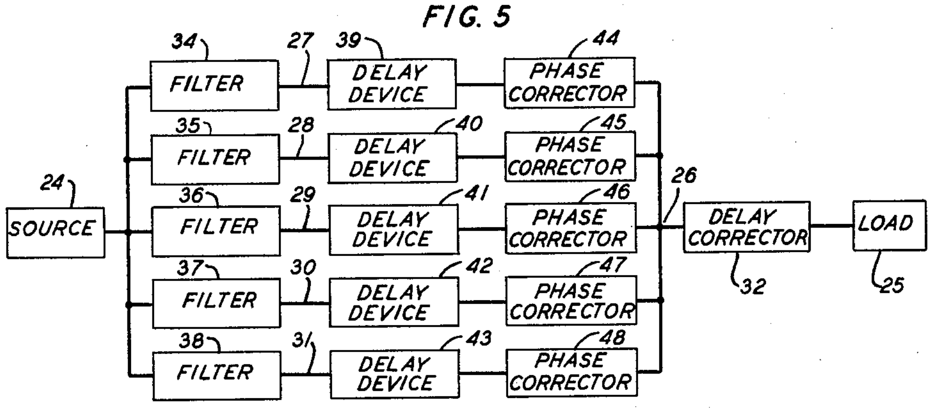
FIGS. 5 and 6 are single-line block diagrams of alternative delay systems in accordance with the invention which will provide the characteristic shown in FIG. 1 or the one shown in FIG. 3.

FIG. 5 shows a delay system in accordance with the invention capable of providing the characteristic 1 of FIG. 1 or 12 of FIG. 3. The block 24 represents a source of multifrequency signals to be delayed, and the block 25 the load or utilization circuit. The source 24 and the intermediate point 26 are connected through a plurality of parallel transmission paths 27 through 31. Each of the paths includes a wave filter, a delay device, and a phase corrector connected in tandem. The order of connection is immaterial. A delay corrector 32 is connected in the path between the point 26 and the load 25.

The required transmission characteristics of the component, two-port networks of FIG. 5 will now be considered. It will first be assumed that the curve 1 is to be provided. Each of the filters will pass one only of the frequency bands indicated in FIG. 1 and suppress all of the other frequencies in the range between $f_1$ and $f_6$. For example, the filter 34 in the branch 27 may pass the band between $f_1$ and $f_2$ and suppress all frequencies between $f_2$ and $f_6$. Since no flat delay is required in the lowest band, the delay device 39 may be omitted. The filter 35 in the branch 28 passes the next band, $f_2$ to $f_3$. The delay device 40 delays all frequencies in this band by an amount which, when added to the delay of the filter 35, will be equal to $D_3$, the height of the block 3 shown in FIG. 1. The other filters 36, 37, and 38 pass the bands $f_3$ to $f_4$, $f_4$ to $f_5$, and $f_5$ to $f_6$, respectively. The other delay devices 41, 42, and 43 furnish the additional delay required to provide the delays $D_5$, $D_7$, and $D_9$ corresponding to the heights of the blocks 5, 7, and 9, respectively. The delay corrector 32 provides the required residual delay characteristic shown in FIG. 2 comprising the blocks 2, 4, 6, 8, and 10. The over-all delay characteristic of the system of FIG. 5 just described will be the curve 1 of FIG. 1.

Figure 8:
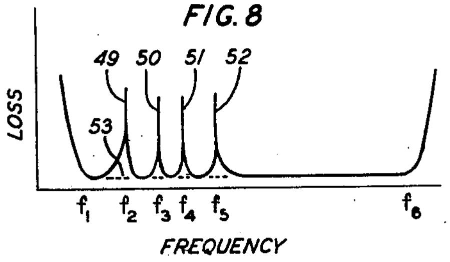
FIG. 8 shows comparative loss-frequency characteristics obtainable with the systems of FIGS. 5, 6, and 7 when the phase correctors are omitted and when they are included.

Since no filter has an infinitely steep cut-off, there must be some overlap of the frequency bands transmitted by the filters 34 through 38 so that the delay system will pass a continuous frequency spectrum between $f_1$ and $f_6$. For example, the filter 34 will pass a small range of frequencies just above $f_2$ and the filter 35 will pass a small range just below this frequency. Furthermore, since the paths 27 and 28 differ in flat delay, their phase shifts will be linear with frequency but will have different slopes. Therefore, in the transition region around $f_2$ where both paths are contributing significantly to the output current at the summing point 26, there will be frequencies at which the currents from the two paths are not in phase. This will cause irregularities in the overall loss characteristic in these transition regions. As shown by the solid-line curve in FIG. 8, these irregularities may take the form of quite prominent spikes of loss such as 49 through 52, at or near the frequencies $f_2$ through $f_5$.

By providing the proper phase relationship between the different pairs of paths, the phase correctors 44 through 47 overcome this difficulty and flatten the loss characteristic. For example, the phase corrector 44 adds sufficient non-minimum phase shift to the path 27, which has less phase shift than the path 28, to make the difference in the phase shift in these two paths equal to $2n\pi$ radians throughout the transition region near $f_2$. The factor $n$ may be any integer, including zero. With this phase relationship, the output currents from the paths 27 and 28 will add in phase throughout the transition region and the loss irregularities in the vicinity of $f_2$ will be greatly reduced, or eliminated. The phase correctors 45, 46, and 47 are designed in a similar manner to correct the phase shifts in the paths 40, 41, and 42 in the transition regions near $f_3$, $f_4$, and $f_5$, respectively. In this example, the phase corrector 48 is not required and may be omitted. The broken-line curve 53 shows the improved loss characteristic obtainable when the phase correctors are added to the delay system. The loss spikes 49 through 52 have disappeared.

The system of FIG. 5, described above, is also capable of providing the linear delay characteristic 12 of FIG. 3. The filters 34 through 38 will pass the respective bands $f_1$ to $f_2$, $f_2$ to $f_3$, $f_3$ to $f_4$, $f_4$ to $f_5$, and $f_5$ to $f_6$ shown in FIG. 3. The delay devices 39 through 43 will furnish the delay required, in addition to the delay of the associated filter, to provide the delays $D_{13}$, $D_{15}$, $D_{17}$, $D_{19}$, and $D_{21}$ represented by the heights of the flat-delay blocks 13, 15, 17, 19, and 21. The delay corrector 32 will supply the residual delay represented by the blocks 14, 16, 18, 20, and 22 in FIG. 4. The phase correctors 44 through 47 add sufficient phase shift to the respective bands to make the difference between the phase shifts in the transition region between each adjacent pair approximately equal to $2n\pi$ radians.

Figure 6:
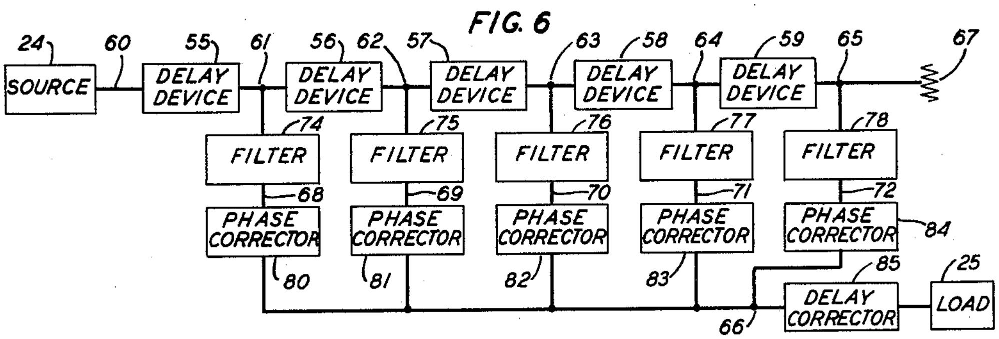

FIG. 6 shows an alternative arrangement of a delay system which is capable of providing the same delay characteristic as the system of FIG. 5. The delay devices 55 through 59 are connected in tandem between the source 24 and a point 65 to constitute a tapped delay line, terminated in the matching impedance 67. The output end 65 and the tapping points 61, 62, 63, and 64 are connected, respectively, through the transmission paths 72, 68, 69, 70, and 71 to the common point 66. Each of these paths includes a wave filter and a phase corrector connected in tandem. The filters are numbered 74 through 78 and the phase correctors, 80 through 84. The point 66 is connected to the load 25 through a delay corrector 85.

In order to provide the linear delay characteristic 12 of FIG. 3, the component two-port networks of FIG. 6 will have the following characteristics:

The filters 74 through 78 will pass the bands $f_1$ to $f_2$, $f_2$ to $f_3$, $f_3$ to $f_4$, $f_4$ to $f_5$, and $f_5$ to $f_6$, respectively, and suppress all other frequencies between $f_1$ and $f_6$. The delay device 55 will have a delay which, when added to the delay of the filter 74, will equal the constant delay $D_{13}$. Likewise, the delays of the devices 56 through 59, when added to the delays of the associated filters 75 through 78, will provide the delay increments $D_{15}-D_{13}$, $D_{17}-D_{15}$, $D_{19}-D_{17}$, and $D_{21}-D_{19}$, respectively.

Figure 4:
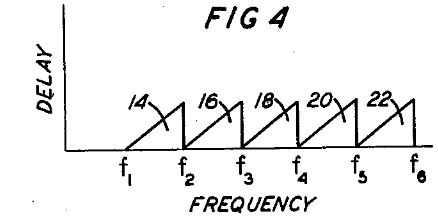
FIG. 4 shows the residual characteristic required in addition to the flat-delay blocks to provide the linear characteristic of FIG. 3.

The delay corrector 85 furnishes the residual delay characteristic shown in FIG. 4.

The phase correctors 80 through 83 add the amount of phase shift required to make the difference between the phase shifts in each adjacent pair of bands approximately $2n\pi$ radians in the transition regions near the frequencies $f_2$, $f_3$, $f_4$, and $f_5$. The phase corrector 84 may be omitted.

Figure 7:
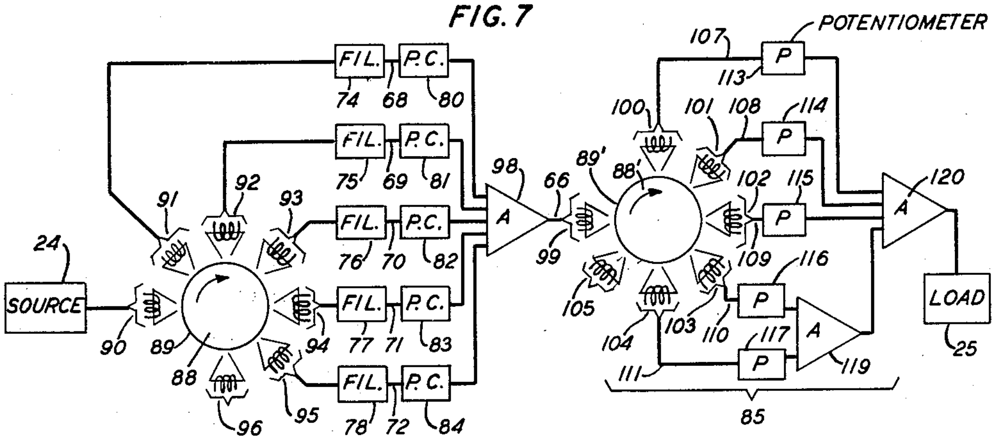
FIG. 7 is a diagram of a system similar to the one shown in FIG. 6 in which the delay is provided by one or more signal storage devices.

FIG. 7 shows a preferred embodiment of the delay system of FIG. 6, in which the delay is provided by a signal storage device 88 which comprises a magnetic recording medium in the form of a cylinder 89, a recording head 90, reproducing heads 91 through 95, and an erasing head 96. The signal from the source 24 is fed to the recording head 90, which transforms the electrical variations into corresponding magnetic variations in a small, adjacent area of the drum 89. As the cylinder 89 revolves in the direction of the arrow, this magnetized area is brought successively under the reproducing heads 91 through 95, which reconvert the magnetic variations into electrical variation. The signal is thus delayed by different amounts which are constant with frequency but depend upon the velocity of the cylinder 89 and the angular spacing of the particular reproducing head from the recording head 90. The signal is obliterated as the magnetized area passes the erasing head 96. The reproducing heads 91 through 95 are connected, respectively, to the input ends of the transmission paths 68 through 72, which correspond to the similarly-numbered paths in FIG. 6. The wave filters 74 through 78 and the phase correctors 80 through 84 in these paths also correspond to the like-numbered networks in FIG. 6. The output ends of the paths 68 through 72 are connected through a summing amplifier 98 to the common point 66, corresponding to the point 66 in FIG. 6. In order to provide the linear delay characteristic 12 of FIG. 1, the reproducing head 91 will be spaced from the recording head 90 the proper distance to obtain a delay which, when added to the delay of the associated filter 74, will give the delay $D_{13}$. Likewise, the reproducing heads 92 through 95 will be spaced to provide the delay increments $D_{15}-D_{13}$, $D_{17}-D_{15}$, $D_{19}-D_{17}$, and $D_{21}-D_{19}$, respectively, when due account is taken of the delays of the filters 75, 76, 77, and 78.

In FIG. 7, the delay corrector 85, connected between the point 66 and the load 25, is of the transversal type employing a signal storage device 88′ to provide the different delays required. The storage device 88′ comprises a rotating magnetic cylinder 89′, which may conveniently be another portion of the cylinder 89 used in the device 88, a recording head 99, a plurality of reproducing heads 100 through 104, and an erasing head 105. The output from the amplifier 98 is fed to the recording head 99 which magnetizes a small adjacent area of the cylinder 89′. After different delay times, this signal is picked up in turn by the reproducing heads 100 through 104. The reproducing heads 100, 101, and 102 are connected, respectively, to the input ends of the transmission paths 107, 108, and 109, which include separate potentiometers 113, 114, and 115. The outputs from the reproducing heads 103 and 104 are fed to the transmission paths 110 and 111 which include the potentiometers 116 and 117. The outputs of the paths 110 and 111 are summed and reversed in phase in the amplifier 119. The outputs of the amplifier 119 and the paths 107, 108, and 109 are summed in the amplifier 120 and fed to the load 25. By properly choosing the angular spacing between the recording head 99 and each of the reproducing heads 100 through 104 and the settings of the potentiometers 113 through 117 and by providing phase reversal in the amplifier 119 for certain of the paths, if required, any desired delay characteristic may be secured from the corrector 85. In this example, the residual delay characteristic of FIG. 4 is obtained. It is to be understood that, in some cases, less than the five paths 107 through 111 may suffice, and also that more paths may be required for good simulation of a complicated residual delay characteristic. Also, depending upon the desired characteristic, either more or less than the two paths 110 and 111 may pass through the amplifier 119 to effect a phase reversal. If required, amplifiers may be included in any or all of the paths 68 through 72 and 107 through 111.

In order to avoid variations in delay, it is desirable that the cylinder or cylinders 89 and 89′ rotate at a constant speed. To this end, the cylinder is preferably made integral with the rotor of an induction motor which is operated by a voltage carefully controlled both in frequency and level. The load is sufficiently constant to cause no appreciable variation in speed. The high rotational inertia minimizes hunting, which is the tendency for a motor to speed up and slow down slightly during a single revolution.

It is to be understood that the above-described arrangements are only illustrative of the application of the principles of the invention. Numerous other arrangements may be devised by those skilled in the art without departing from the spirit and scope of the invention.

What is claimed is:

1. A system for providing a given delay characteristic over a range of frequencies comprising means for dividing the signal to be delayed into two frequency bands having bands by different constant amounts each of which is approximately equal to the minimum required delay in the particular band, means for making the difference between the phase shifts in the bands approximately equal to an integral multiple of $2\pi$ radians near the common boundary, means for recombining the bands, and means for introducing the residual delay required to provide the given characteristic.

2. A signal delay system comprising two transmission paths connected in parallel, each of the paths including a wave filter, the filters having adjacent pass bands, one of the paths including a delay device having an approximately constant delay, and the other path including a phase corrector adapted to make the difference between the phase shifts in the paths approximately equal to an integral multiple of $2\pi$ radians near the common boundary of the bands, and a delay corrector connected in series with the parallel combination of paths, the delay corrector being adapted to furnish the required residual delay for both of the bands.

3. A signal delay system having a desired characteristic varying with frequency comprising means for separating the signal into components having adjacent frequency bands, a signal storage device adapted to delay the components by different amounts chosen to provide a stepped characteristic approximately matching the desired characteristic, means for recombining the components, means for supplying the difference in delay between the two characteristics, and means for making the difference between the phase shifts in each adjacent pair of bands approximately equal to an integral multiple of $2\pi$ radians near the boundary between the pair.

4. A signal delay system comprising a magnetic recording medium, an electromagnetic transducer, means for moving the medium relative to the transducer for recording electric signals as magnetic variations in the medium, two reproducing heads associated with the medium and spaced at different distances from the transducer, two transmission paths connected, respectively, to the reproducing heads, each of the paths including a wave filter and the filters having adjacent transmission bands, a phase corrector in one of the paths adapted to make the difference between the phase shifts in the bands approximately equal to an integral multiple of $2\pi$ radians near their common boundary, means for adding the output signals from the paths, and a delay corrector connected to the summing means, the delay corrector being adapted to furnish the residual delay in both bands required to provide a desired over-all delay characteristic.

5. A signal delay system comprising a magnetic recording medium, a recording head, means for moving the medium relative to the recording head, two reproducing heads associated with the medium and spaced at different distances from the recording head, two transmission paths connected, respectively, to the reproducing heads, each of the paths including a wave filter and the filters having adjacent transmission bands, a phase corrector in one of the paths adapted to make the difference between the phase shifts in the bands approximately equal to an integral multiple of $2\pi$ radians near their common boundary, means for adding the output signals from the paths, and a delay corrector adapted to furnish the residual delay required to provide a desired over-all delay characteristic comprising a second recording head and a plurality of additional reproducing heads associated with the medium to provide a plurality of different delays, transmission paths connected, respectively, to the additional reproducing heads, means for adjusting the transmission level in each of the additional paths, and means for summing the output signals from the additional paths.

6. The method of delaying an electric signal by selected amounts which differ with frequency over a range of frequencies which comprises dividing the range into a plurality of mutually exclusive bands, delaying the frequencies in each band by a constant amount approximately equal to the minimum selected amount in the particular band, increasing the phase shift of some of the frequencies in one of each adjacent pair of bands to make the difference between the phase shifts in the pair approximately equal to an integral multiple of $2\pi$ radians near the adjacent edges of the pair, recombining the bands, and additionally delaying the frequencies in the entire range by approximately the difference between the constant amounts and the selected amounts.

7. The method of providing a selected, frequency-variable delay characteristic which comprises dividing the characteristic into a plurality of adjacent frequency bands, delaying the bands by amounts which are equal in each band but differ from band to band, recombining the bands, additionally delaying each band by the difference between the fixed delay of the band and the selected characteristic, and adding phase shift near one edge of one of each adjacent pair of bands to make the difference between the phase shifts in the pair approximately equal to an integral multiple of $2\pi$ radians near the adjacent edges of the pair.

References Cited in the file of this patent

UNITED STATES PATENTS

| | | |
|---|---|---|
| 1,681,252 | Nyquist | Aug. 21, 1928 |
| 2,716,733 | Roark | Aug. 30, 1955 |
| 2,907,838 | Ross | Oct. 6, 1959 |

UNITED STATES PATENT OFFICE
CERTIFICATE OF CORRECTION

Patent No. 3,135,932 June 2, 1964

John T. Bangert

It is hereby certified that error appears in the above numbered patent requiring correction and that the said Letters Patent should read as corrected below.

Column 5, line 9, after "having" insert -- a common boundary, means for delaying each of the --.

Signed and sealed this 13th day of October 1964.

(SEAL)
Attest:

ERNEST W. SWIDER
Attesting Officer

EDWARD J. BRENNER
Commissioner of Patents